Jan. 20, 1942.  A. V. CASELLI ET AL  2,270,667
PROCESS FOR EXTRACTION
Filed May 20, 1940
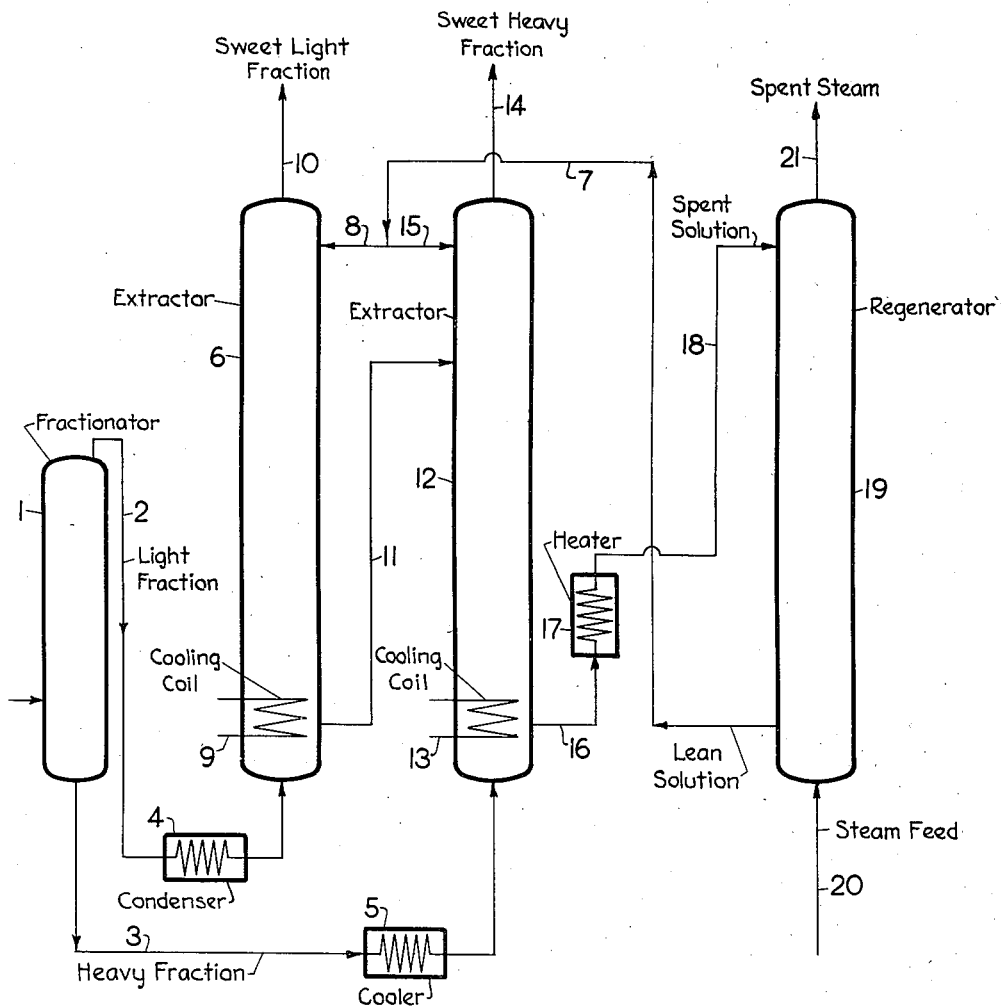
Inventors: Albert V. Caselli
Alan C. Nixon
By their Attorney:

Patented Jan. 20, 1942

2,270,667

UNITED STATES PATENT OFFICE 2,270,667

PROCESS FOR EXTRACTION

Albert V. Caselli, Oakland, and Alan C. Nixon, Berkeley, Calif., assignors to Shell Development Company, San Francisco, Calif., a corporation of Delaware Application May 20, 1940, Serial No. 336,142

5 Claims. (Cl. 196—30)

This invention relates to a modification of an extraction process whereby transferable components contained in two or more solutions are transferred to a solvent which is substantially immiscible with said solutions. The several solutions are kept separate and are treated with different portions of the solvent and the resulting fat solvents are then combined as will be described later.

The process is particularly applicable to, though not necessarily limited to, regenerative processes wherein an extraction solvent alternately removes solute from a first solvent medium and is stripped of this solute by a stripping medium, the extraction solvent then being returned to the extraction zone. For example, the process is particularly useful in the sweetening of gasoline by the so-called solutizer process for mercaptan extraction.

It is the purpose of this invention where two or more solutions are involved to extract with a minimum amount of solvent in a manner so that the several solutions need not be combined during the treatment. It is a further purpose to effect a saving in the amount of solvent required to extract two or more solutions over that required in the conventional extraction of said solutions, by utilizing certain portions of the solvent for extracting of more than one of said solutions.

To keep the treated solutions separate is often a marked advantage in commercial practice. For example, in petroleum refinery practice, a relatively small number of stocks are kept on hand from which blends are prepared to meet various specifications as the need arises. It is therefore desirable to keep the several fractions produced in the course of refining separate and to avoid their being blended unnecessarily in the course of the refining treatment they receive.

In the conventional countercurrent extraction of a mixture of components of different coefficients of extraction, an excess of solvent is normally required over that necessary for the removal of the easily extractable components, in order to have enough solvent present for the removal of the more difficultly extractable. The resulting fat solution of the extracting solvent is therefore relatively dilute with respect to the easily extractable components. As is known, the regeneration of a fat solution with the aid of a convection medium is essentially a reversal of the extraction, and the easily extractable components are more difficult to strip out from the fat solution than the more difficultly extractable ones. It follows that in the regeneration of a "dilute fat solution," an amount of convection medium greater than the minimum is required, which minimum would be necessary, had the easily extractable components been extracted with a minimum instead of an excess of solvent. Therefore, conventional countercurrent extraction of a mixed solute and regeneration of the resulting fat solution violates the principle that maximum economy of transfer of a component from one phase to another by means of an intermediate solvent is obtained when a minimum volume of the intermediate solvent is used. Maximum economy is effected by extracting each component of the mixed solute with just the minimum amount of solvent required to remove that component. The present invention approaches this ideal situation by allowing two or more components or groups of components of different "ease of transference" each to be extracted with the minimum amount of solvent.

The "ease of transference" as herein defined depends upon the initial and final concentrations of the component or components in the fraction as well as upon their respective extraction coefficients.

The extraction coefficient of a given component is defined as the concentration of the solute in the extracting solvent divided by the concentration of the same solute in the solution phase at equilibrium; and the ease of transference may be measured by the inverse volume ratio of extracting solvent to solution which is required to reduce under a standard set of conditions the concentration of transferable material in the solution to a predetermined final concentration. In other words for increasing coefficient of extraction, starting with a given concentration of solute, less extracting liquid is required to reduce its concentration to a certain level and hence the ease of transference rises with increasing coefficient of extraction. Conversely, with increase in concentration, for a given coefficient of extraction, more solvent is required to reach this level, and hence the ease of transference decreases with increase in starting concentration.

In our co-pending application Serial No. 313,566, a process is described in which the solution phase containing material to be extracted is divided in a manner to produce at least two solution fractions. The fractions are then extracted in a sequence such that the fraction containing material of lowest ease of transference is treated with the highest ratio of extracting solvent to solution containing extractable material. While this method is effective and results in considerable savings it has the disadvantage that it normally requires the mixing of the several fractions if operated under conditions of greatest efficiency.

In carrying out the process of this invention, the solutions are subjected to extraction preferably in countercurrent in the following manner: Each solution is contacted with solvent in at least one separate extraction zone. Lean solvent is divided into as many portions as there are solutions. These portions are fed to the separate extraction zones containing the solutions in sufficient amounts to produce the desired completeness of removal of extractable material from each solution. To simplify the explanation, the solutions which contain extractable components shall be designated A, B, C, etc., solution A containing the components of highest ease of transference and the others containing components in the order of decreasing ease of transference. The several solvent portions for contacting solutions A, B, and C, etc., shall be designated as $a$, $b$, $c$, etc., respectively.

Solution A is treated, preferably in countercurrent, with solvent portion $a$ in extraction zone I to produce a treated solution A and a spent solvent $a$. Solution B is fed to one end of extraction zone II and solvent portion $b$ is introduced at the opposite end of the zone. The spent portion $a$ from extraction zone I is fed to zone II preferably at some intermediate point between the point of entrance of the lean portion $b$ and the solution B. The solvent portions $a$ and $b$ combine in zone II and are separated as a single spent solvent which is then transferred to an intermediate point of extraction zone III into which lean solvent portion $c$ is also fed. Extraction in subsequent extraction zones, if any, is carried out as illustrated by zones II and III. From the last extraction zone the combined substantially completely spent solvent portions $a+b+c+$etc. are withdrawn and are regenerated to produce a lean solvent which is redivided and returned to the several extraction zones as described.

It will be seen that by this process each solution is kept separate from other treated solutions and that further each solution containing components of lower ease of transference is extracted with a higher solvent to solution ratio than the preceding solution through at least a portion of the extraction zone.

It is essential for the efficient operation of our process that the eases of transference of the components in the several solutions be markedly different. If there is no difference in the eases of transference, the process would operate at a disadvantage. An explanation follows:

Under our modified extraction procedure, one solution containing components of high ease of transference is treated with a small portion of the solvent to produce a treated liquid and a first spent solvent portion. This spent portion and a remaining portion of the lean solvent are fed to the second extraction zone as described above.

Due to high ease of transference of components extracted in the first zone, the extracted components will have little tendency to be returned to the extractant solution in the second extraction zone. Conversely then, if the ease of transference of the first extracted components were low, then they would be returned to the second extractant solution.

Since, moreover, accumulation of transferable components in the solvent normally reduces the extraction capacity of the solvent rather than enhances it, it follows that the extracted components in the solvent will not enhance the extraction efficiency, but on the contrary usually will reduce it. In other words the extracted components from the first extractant solution do not normally aid in the extraction of transferable components from the second extractant solution.

The invention is more readily understood by reference to the accompanying drawing representing a simplified flow diagram of the process. A special application of the process is illustrated in this diagram, namely the sweetening of sour gasoline by the so-called solutizer process for extraction of mercaptans by means of aqueous solutions of alkali metal hydroxide containing a solubility promotor for the mercaptans and regeneration of the resulting spent solution by steam stripping.

Sour gasoline enters the fractionation column 1 from a source not shown and is fractionally distilled into two fractions, a light fraction containing the low boiling usually more readily extractable mercaptans and a heavier fraction containing higher boiling usually more difficultly extractable mercaptans.

The two fractions are withdrawn from fractionator 1 through lines 2 and 3 and are condensed and/or cooled in cooling coils 4 and 5. The fractions are then treated in individual countercurrent extraction zones.

6 is an extraction column which receives a portion of the extracting solvent from line 7 through line 8 near its top. Into the bottom of extractor 6 is introduced the light fraction from condenser 4. The temperature at the bottom of this extraction column is controlled by cooling coil 9. The gasoline fraction flows upward in countercurrent to the extracting solvent and the resulting treated oil leaves the column at the top through line 10. The spent extracting solvent emerges from the bottom through line 11.

12 is a second extraction column receiving the heavier fraction near the bottom from cooler 5. Temperature control in this column is maintained by means of cooling coil 13. The gasoline fraction flows upward through the column and leaves at the top through line 14, while the remaining portion of the solvent in line 7 which had not been diverted to column 6 is introduced at its top through line 15. The spent extracting solvent from column 6 is transferred through line 11 to column 12 where it is introduced at a point intermediate between the points of entrance of lean solvent and heavy gasoline fraction. The two extracting solvents flowing downward through column 12 are united and leave it through line 16.

The resulting combined solvent is heated in heater 17 and passes through line 18 to the steam stripper or regenerator 19 to be stripped of mercaptans preferably in the manner described in the Yabroff-White Patent No. 2,152,724. Steam for stripping may be introduced through line 20 and mercaptans together with spent stripping steam emerge through line 21. Regenerated treating solution returns to the system through line 7 and is divided into two portions which proceed through lines 8 and 15 respectively as described.

It is understood that the use of specific types of contacting equipment, heaters, heat exchangers, coolers, condensers wherever necessary is within the skill of the designer for such equipment.

From the earlier description it is clear that the sour gasoline may be fractionated into more than two fractions, e. g. 3, 4, etc., in which case an equal number of extraction zones will have to be provided, the fractions being treated in the order of decreasing ease of transference.

It is further understood that the several gasolines so treated need not be produced by fractional distillation of a single sour gasoline but may be derived from different sources as long as the mercaptans which they contain have markedly different eases of transference.

The temperature of the extraction columns 6 and 12 are preferably maintained between about 0–60° C. At lower temperatures, difficulties may arise due to excessive viscosity or precipitation of some of the components of the extracting solution, and at higher temperatures, the efficiency of mercaptan extraction is greatly diminished.

Suitable amounts of solutized aqueous caustic alkali in the mercaptan extraction process are normally about 5 to 100 volume per cent of the total gasoline feed although amounts outside of these limits may be used where the ease of transference of the components in the solution is very low or very high as the case may be. Thus for example in sweetening gasoilne, the solvent requirement for extraction of a low boiling gasoline fraction will usually be about 15 to 25 volume percent, while a higher boiling fraction may require 100 to 200 volume percent of solvent effectively to sweeten the gasoline.

It is practically impossible to predict in a general way the optimum gasoline-solvent ratios or the ratios of the several portions into which the solvent is to be divided or the ratios of the several fractions of gasoline which are produced by fractional distillation. The extent of fractionation of the gasoline and division of the solvent into portions of different size can only be determined experimentally, the general rule being that the different fractions should contain transferable components of widely different eases of transference, and that each fraction should be treated with just enough solvent to effect the desired degree of extraction in each zone.

The material to be extracted may be contained in any liquid which is substantially stable under the conditions and for the duration of the treatment and which is substantially insoluble in and chemically inert to the extracting solvent. When extracting weak organic acids with caustic alkali such organic liquids are, for example (aside from hydrocarbon oils already mentioned, such as petroleum distillates, coal tar distillates, hydrogenated aromatic hydrocarbons, butanes, pentanes, hexanes, benzene, toluenes, xylenes, etc.), chlorinated hydrocarbons as carbon tetrachloride, ethylene dichloride, chlorpropane, etc.; basic organic liquids as quinolines, alkylated pyridines, water insoluble amines, etc.

The preferred method for producing from a single solution several fractions containing extractable material of different eases of transference is distillation. However, other methods may be applicable, such as fractional precipitation, fractional solvent extraction or any process, physical or chemical, which permits segregation of different fractions containing transferable material of different eases of transference.

While the foregoing process has been described in connection with extraction of mercaptans from sour gasoline it is applicable as well to the extraction of other substances from their solutions such as ketones with the aid of aqueous bisulfite solution, di-olefines from hydrocarbon liquids with solutions of cuprous chloride in water or aliphatic amines, separation of components of high and low octane rating from gasoline, etc.

Our invention is further illustrated by the example below:

A sour light fraction containing 0.17% mercaptan sulfur and a sour heavy fraction containing .019% mercaptan sulfur of a cracked gasoline were treated as follows:

The light fraction was extracted in a three stage countercurrent first extraction system and the heavy fraction in a second 9 stage system. The volume ratio of the light to the heavy cut was 3 to 1.

The fractions were extracted with an aqueous solutizer solution having the following composition: 6N potassium hydroxide and 3N potassium isobutyrate, at a temperature of 90° F. When operating under the modified extraction method, the used solutizer solution from the first system was fed into stage 6 of the second system and the total amount of solutizer solution was again the minimum required to bring the mercaptan sulfur content to the same level.

Two types of extraction were carried out: conventional and modified. In the conventional extraction each gasoline was extracted with the minimum amount of solutizer solution necessary to reduce the mercaptan sulfur content to a certain level. Likewise when operating under the modified or "split" extraction process, each gasoline was extracted with the minimum amount of solutizer solution necessary to reduce the mercaptan sulfur content to the level achieved previously by extraction under the conventional method. Results were as follows:

*Summary of results of application of split extraction to unblended gasoline streams*

Total number of stages=12
Ratio of light to heavy cut=3:1

| Type of extraction | Overall solutizer-gasoline volume ratio | Final mercaptan sulfur content, percent w | | Decrease in the amount of solutizer solution required for treatment of both streams, percent |
|---|---|---|---|---|
| | | Light cut | Heavy cut | |
| Conventional | 0.3 | 0.0002(1) | 0.0004(7) | |
| "Split" | 0.225 | 0.0002(1) | 0.0004(7) | 25.0 |
| Conventional | 0.4 | 0.0002(1) | 0.0003(1) | |
| "Split" | 0.3 | 0.0002(1) | 0.0003(1) | 25.0 |

From comparison of the conventional with the modified split extraction method it will be seen that the split method requires the circulation of 25% less solutizer solution to effect the same degree of mercaptan removal.

We claim as our invention:

1. In an extraction process wherein mercaptans of different degrees of ease of transference contained in a hydrocarbon oil are extracted with an aqueous solution of alkali metal hydroxide and solutizer which is substantially immiscible with and chemically inert to said hydrocarbon oil, the improvement comprising fractionally distilling the hydrocarbon oil to produce several fractions containing mercaptans of different degrees of ease of transference, flowing each of said fractions containing said mercaptans through a separate extraction zone to produce as many separate treated fractions, dividing said aqueous solution into a number of portions equal to the number of fractions of the hydrocarbon oil, flowing a first portion of said aqueous solution through said extraction zones in series to contact said fractions in the order of decreasing ease of transference of the mercaptans which the fractions contain, introducing into each subsequent extraction zone an additional portion of said aqueous solution to mix with the previous portion or portions and to flow through the extraction zone and subsequent extraction zones in series, and withdrawing from the last zone substantially spent aqueous solution containing the combined portions of said aqueous solutions and the extracted mercaptans.

2. In a regenerative process of extracting mercaptans of different degrees of ease of transference contained in two or more hydrocarbon oils from their solution in said oils with an aqueous solution of alkali metal hydroxide and solutizer which is substantially immiscible with and chemically inert to said hydrocarbon oils, the improvement comprising, flowing each of said hydrocarbon oils containing said mercaptans through a separate extraction zone to produce as many extracted liquids, dividing said aqueous solution of alkali metal hydroxide into a number of portions equal to the number of liquids, flowing a first portion of said aqueous solution through said extraction zones in series to contact said hydrocarbon oils in the order of decreasing ease of transference of the mercaptans which the hydrocarbon oils contain, introducing into each subsequent extraction zone an additional portion of said aqueous solution to mix with the previous portion or portions and to flow through any subsequent extraction zones in series, withdrawing from the last zone substantially spent aqueous solution containing the combined substantially spent portions of said aqueous solutions and the extracted mercaptans, passing steam through said spent aqueous solution to remove mercaptans contained therein, and returning the resulting stripped aqueous solution to the extraction zones again as outlined.

3. In a process for extracting a plurality of water insoluble organic liquids containing in solution weakly organic acids of different degrees of ease of transference with a single solvent comprising an aqueous solution of caustic alkali, said solvent being substantially immiscible with and inert to said liquids, the steps comprising dividing said solvent into a number of portions equal to the number of liquids, first contacting a liquid containing acids of greater ease of transference with a first portion of said solvent in a first contact zone to produce a first treated liquid and a first spent solvent, contacting a second liquid containing acids of lesser ease of transference with said first spent solvent and a second portion of fresh solvent in a second contact zone to produce a second treated liquid and withdrawing from said second zone a spent solvent containing combined portions of said solvent.

4. In a process for extracting a plurality of liquid hydrocarbons containing in solution mercaptans of different degrees of ease of transference with a single solvent comprising aqueous alkali metal hydroxide and solutizer, said solvent being substantially immiscible with and inert to said liquid hydrocarbons, the steps comprising dividing said solvent into a number of portions equal to the number of liquids, first contacting a liquid hydrocarbon containing mercaptans of greater ease of transference with a first portion of said solvent in a first contact zone to produce a first treated hydrocarbon and a first spent solvent, contacting a second liquid hydrocarbon containing mercaptans of lesser ease of transference with said first spent solvent and a second portion of fresh solvent in a second contact zone to produce a second treated liquid hydrocarbon, and withdrawing from said second zone a spent solvent containing combined portions of said solvent.

5. The process of claim 4 wherein the solutizer is potassium isobutyrate.

ALBERT V. CASELLI.
ALAN C. NIXON.